No. 849,789. PATENTED APR. 9, 1907.
J. C. HURD.
TWEEZERS.
APPLICATION FILED FEB. 7, 1906.

Witnesses:

Inventor.
James C. Hurd,
by
Attorney.

UNITED STATES PATENT OFFICE.

JAMES C. HURD, OF SPRINGFIELD, MASSACHUSETTS, ASSIGNOR OF ONE-HALF TO FRANCIS K. WILLIAMS, OF SPRINGFIELD, MASSACHUSETTS.

TWEEZERS.

No. 849,789.     Specification of Letters Patent.     Patented April 9, 1907.

Application filed February 7, 1906. Serial No. 299,907.

*To all whom it may concern:*

Be it known that I, JAMES C. HURD, a citizen of the United States of America, and a resident of Springfield, in the county of Hampden and State of Massachusetts, have invented certain new and useful Improvements in Tweezers, of which the following is a full, clear, and exact description.

This invention relates to improvements in tweezers of character such as commonly used by printers, barbers, and persons generally, and particularly pertains to the construction of the tweezers and a handle therefor constructed with respect to the convenient engagement therewith and disengagement therefrom of a casing for inclosing while the tweezers are not in use the separable members or blades thereof in a manner to leave the blades unconstricted and spread, whereby the spring quality thereof is not impaired.

The invention consists in a tweezers having a shank and a handle therefor constructed with a forwardly open circular socket in which the tweezers-shank is tightly fitted and said handle having its forward portion externally of cylindrical form and a tubular case having its rear portion of cylindrical form to fit the externally-cylindrical portion of the handle and having its forward portion of increased diameter to permit during disuse of the incased tweezers the distention of their spring members, and, furthermore, consists in certain structural features of the shank of the tweezers and in the socketed handle therefor, hereinafter particularly pointed out.

Figure 1:
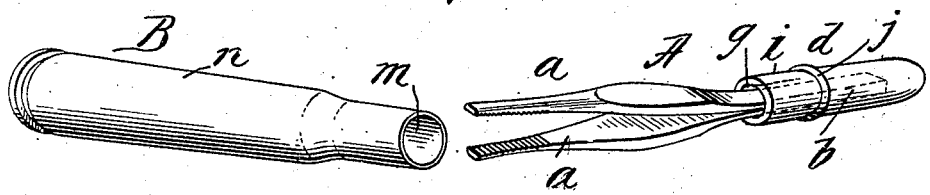
Figure 2:
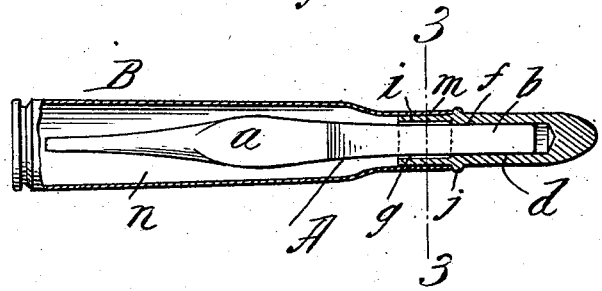
Figure 3:
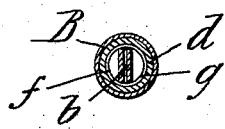
Figure 4:
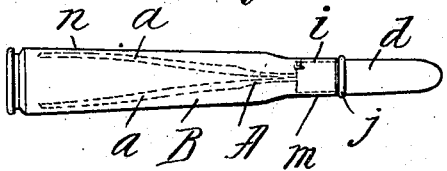

In the accompanying drawings, Figure 1 is a perspective view of the tweezers and case in separated relation. Fig. 2 is a longitudinal sectional view through the united tweezers and case. Fig. 3 is a cross-sectional view on line 3 3, Fig. 2. Fig. 4 is a side view of the tweezers and case fitted together.

Similar characters of reference indicate corresponding parts in all of the views.

In the drawings, A represents the tweezers, of which $a$ $a$ are the separable members or blades, the same comprising the shank $b$, joined at the rear and made with parallel edged portions, and $d$ represents a handle for the tweezers constructed with a forwardly open circular socket $f$, in which the parallel-edged shank of the tweezers is connected with a hard driving fit. The said socket is of increased diameter, as shown at $g$, at its forward portion, whereby it is free of the separable portions of the tweezers-blades near their junction at and rearwardly from which the shank is constituted, and thus the socketed handle is free of the separable portions of the tweezers thereby surrounded and forms no obstruction to the natural spreading of the blades. The said handle is made externally at its forward portion of cylindrical form, as represented at $i$, and has at a suitable distance to the rear of its forward open end an external shoulder or bead $j$.

B represents the case, open at its rear end and having its rear end portion of cylindrical form, as represented at $m$, to have a sliding frictional fit about the cylindrical portion $i$ of the handle, and the forward portion $n$ of the case is of increased diameter, so as to permit when the tweezers is not in use and inclosed by the case the maximum spreading of the tweezers-blades, so that, as manifest, the spring quality of the blades will not become impaired.

The cases may be identical in form and construction as the shells for rifle-cartridges and are cheaply procurable or may be readily produced by the employment of common machinery now in extensive use.

I claim—

1. In a device of the character described, a tweezers having a shank, and a handle therefor constructed with a forwardly open circular socket in which the tweezers-shank is tightly fitted, and said handle having its forward portion externally of cylindrical form, and a tubular case having its rear portion of cylindrical form to fit the externally cylindrical portion of the handle and having its forward portion of increased diameter to permit, during disuse of the incased tweezers, the distention of their spring members.

2. In a device of the character described, a tweezers having a shank and a handle therefor constructed with a forwardly open circular socket in which the opposite edges of the tweezers-shank tightly fit, said socket being of increased diameter at its forward portion and free of the separable portions of the tweezers thereby surrounded, and said handle having its forward portion externally of cylindrical form, and a tubular case having its rear portion of cylindrical form to fit the externally cylindrical portion of the handle and having its forward portion of increased diameter to permit, in disuse, the distention of the spring members of the tweezers.

Signed by me at Springfield, Massachusetts, in presence of two subscribing witnesses.

JAMES C. HURD.

Witnesses:
WM. S. BELLOWS,
G. R. DRISCOLL.